Patented Oct. 8, 1935

2,016,595

UNITED STATES PATENT OFFICE 2,016,595

WATER INSOLUBLE UREA REACTION PRODUCT AND PROCESS OF PREPARING SAME

Melville C. Dearing, Palatine, Ill., assignor to Economy Fuse and Manufacturing Company, Chicago, Ill., a corporation of New York No Drawing. Application September 6, 1932, Serial No. 631,899

2 Claims. (Cl. 260—3)

This invention relates to reaction products of urea and formaldehyde and particularly to products in powdered form which can be moulded under combined heat and pressure to form infusible and insoluble mechanically resistant objects.

This invention relates further to the process of producing the reaction products above referred to and also to the process of producing final moulded objects therefrom and to the final moulded objects themselves.

It is an object of this invention to provide a process which is productive of a reaction product of urea and formaldehyde existing in a powdered form adapted for moulding under heat and pressure to form final moulded objects possessing high water resistance.

It is a further object to provide, in addition to the aforementioned process, the additional steps of heating and moulding productive of the final moulded objects.

It is a further object to provide a urea-formaldehyde reaction product existing in a powdered form capable of producing new and different final moulded objects having high water resistance.

In the applicant's co-pending application entitled "Urea-formaldehyde reaction products and process of preparing same", Serial No. 630,700, filed August 27, 1932, there is disclosed a process for obtaining urea-formaldehyde reaction products which are adapted to be moulded under heat and pressure to form transparent, translucent, or opaque, mechanically resistant objects.

The process of said co-pending application is characterized by a lowering of the initial uncombined formaldehyde concentration to such an extent that a separation of products occurs when the treated solution is largely diluted.

An example of such a process may be described as the preparation of an initially water soluble (or formaldehyde soluble) product by the interaction of two molecular weights of formaldehyde (pH 5) and one molecular weight of urea; the lowering of the formaldehyde concentration of the initial solution by any suitable method as, for example, a modified steam distillation, repeated boiling down to a syrupy condition with slight dilution at the end of each boiling down period, or by dialysis; and finally the dilution of such a solution by pouring it into at least its volume of water.

As I described in said co-pending application, moulded objects produced therefrom are quite strong mechanically. They are, as a rule very slightly affected by prolonged immersion in cold water, but are softened considerably by immersion in boiling water.

In the process set forth in said co-pending application, the formaldehyde reducing treatment is effective to convert the product to a point approaching the gel stage of existence, without, however, reaching the gel stage, so that for the purpose of this application it should be understood that what is considered to be an intermediate product exists throughout a range of the conversion action, and that the intermediate product above referred to is in that condition of existence peculiar to the more reacted end of the range.

It has now been discovered that the effect of the formaldehyde reducing treatment and its effect in converting the intermediate product to a point approaching the gel stage is an important factor in addition to the removal of formaldehyde because intermediate products existing in the more reacted form are productive of the good water-resisting products above referred to when poured into acidulated water.

Accordingly, experiments have been conducted in which the intermediate product obtained by various different methods has been converted to a point approaching the gel stage, and in these various experiments similar good products have been produced without necessarily reducing the quantity of uncombined formaldehyde.

For instance, it has been found that if the relatively large volume of water into which the treated solution is poured contains a small amount of a strong acid, as for example hydrochloric acid, the products so obtained are capable of being moulded into objects which are substantially unaffected by quite prolonged immersion in boiling water.

The amount of acid preferred in this and in examples to be described subsequently is such as to produce a pH of 1.5 in the water to which it is added. Somewhat smaller amounts may be used, although no advantage is gained thereby.

In order to assist in the understanding of this invention it is deemed advisable to point out that the reaction products of urea and formaldehyde under appropriate conditions pass from an initial stage to an intermediate stage. These intermediate products are gradually transformed under suitable conditions into a gelatinous stage. The transformation during the intermediate stage is a gradual one and cannot be definitely defined, inasmuch as the solution of the intermediate products passes gradually from a thinly fluid condition to a highly viscous condition, so that the broad term "intermediate products" covers a relatively wide range of products differing by the degree of reaction. In this specification those intermediate products which are nearly approaching the gel stage are termed highly reacted intermediate products.

In analyzing the above results, the fact that the formaldehyde reducing treatment also produces a highly reacted intermediate product is found to be of importance when said intermediate product is poured into an acidulated solution having a pH of approximately 1.5.

Accordingly, other experiments have been conducted with highly reacted intermediate products prepared under conditions where the formaldehyde concentration was not appreciably reduced and, surprisingly enough, the same good water-resisting products were produced when the intermediate product was poured into acidulated water as above described.

In practice, an initial product may be prepared from two molecular weights of forty per cent formaldehyde and one molecular weight of urea at any desired pH, preferably 5.0, and subjecting this solution to steam distillation. Water is preferably added at such a rate as to prevent any great diminution of the volume of the solution and thus prevent gelation or the development of such a viscosity as would interfere with the steam distillation. In spite of these additions of water, a progressive increase in the viscosity of the solution occurs, the rate of increase being dependent on the initial ratio of urea to formaldehyde and upon the acidity of the solution. It is desirable to stop the passage of the steam previous to gelation and to pour the product into a relatively large volume of water which has been acidulated to a pH of approximately 1.5, whereupon a water soluble product separates.

This invention is characterized by precipitation from a solution of an intermediate product which has been converted through the intermediate range to a point near the commencement of the gel stage under conditions which will permit of such treatment without causing the solution to actually gel, or precipitation to occur.

Specific examples showing preferred methods of obtaining the products of this invention will now be given, but they are to be considered merely as illustrative, and not as limiting the invention in any respect.

Example 1

To 300 parts of 40% formaldehyde, the pH of which has been adjusted to 5, add 50 parts of urea and bring the solution to boiling temperature in a flask fitted with a reflux condenser. Upon cessation of ebullition add another 30 parts of urea and again bring the contents of the flask to a boil. Upon cessation of ebullition add another 30 parts of urea and again boil the solution. Continue the boiling under the reflux condenser for about four hours or until a syrupy product is obtained. Add 100 parts of hot water and continue the refluxing until the product again becomes syrupy. The addition of water and the refluxing should be continued for about twenty-two hours, whereupon add 700 parts of hot water and then pour the product into 1000 parts of acidulated water having a pH of 1.5. A heavy precipitate will be formed. This may be washed, dried at a low temperature (preferably room temperature) and moulded at a temperature of about 140° C. About seven minutes are desirable for a bar about ¼ in. in thickness. The moulded piece is substantially unaffected by hot water.

Example 2

To 400 parts of 40% formaldehyde having a pH of 3.0 add 100 parts of urea in small portions, allowing reaction to ensue before addition of a subsequent portion. Boil the solution so obtained under a reflux condenser for nineteen hours, and then distill until a syrupy product is obtained. Pour this product into 1000 parts of acidulated water having a pH of 1.5. A precipitate forms in a few hours. It will have the characteristics of the product described in Example 1.

Example 3

To 200 parts of 40% formaldehyde the pH of which has been adjusted to 5 add 76 parts of urea in three portions, while refluxing the solution for about fifteen minutes between each addition of urea. After the final addition reflux the solution forty-five minutes and thereupon add 3½ parts of normal formic acid. The product may then be distilled to a syrupy condition and poured into 1000 parts of acidulated water having a pH of 1.5. Moulded products from the precipitate so formed are hot water resistant.

Example 4

To 200 parts of 40% formaldehyde the pH of which has been adjusted to 5 add 76 parts of urea in three portions, while refluxing the solution one minute between each addition of urea. After the third addition of urea reflux the solution thirty minutes and then add 24 parts more of urea. It will be noted that this amount of urea is considerably in excess of that customarily used in the art. After this addition reflux the solution five minutes. Some increase in viscosity will occur. Then pour the solution into 1000 parts of acidulated water having a pH of 1.5. A precipitate having the above described properties will be obtained.

Obviously variations may be made without departing from the spirit of this invention. The essential features are a comparatively long heat treatment for producing the highly reacted intermediate product under conditions which will prevent precipitation, followed by pouring into acidulated water for precipitating the moulding product.

It is known that prior to this invention it has been proposed to form initial water soluble products, to dilute them largely and to reflux the diluted solutions in the presence of electrolytes until precipitation or separation of a water insoluble product is obtained. See British patent to Pollak, No. 271,037, of January 28, 1927. No claim is made to electrolytes in general, and indeed many electrolytes are unsuitable for the purpose of this invention as they will not produce a product which may be moulded readily into hot water resistant articles. For example, it is found that ammonia is unsuitable, inasmuch as hot water resistant objects are not obtained thereby.

In addition, a fundamental distinction between the present process and that of Pollak is that Pollak's process involves dilution with relatively large volumes of water prior to the reaction treatment of the intermediate product, so that precipitation occurs long before a highly reacted intermediate product essential to this process can be obtained. In other words, the practical distinction is that Pollak's process involves reacting relatively dilute solutions of the intermediate products in the presence of electrolytes, resulting in precipitation long before the highly reacted product of the present process is reached, whereas the present invention reacts in a relatively concentrated condition and in the absence of substantial amounts of electrolytes.

Nor is this invention directed to a process whereby diluted solutions are refluxed in the presence of acid until precipitation occurs. In general the products of this invention will precipitate upon dilution without the addition of electrolytes in general or acid in particular.

The acid of this process, although it may accelerate or assist in the precipitation process, serves primarily as a converting or catalytic agent. That is to say, the product which would ordinarily be obtained without the use of an acid is on account of, or due to, the presence of the acid converted to a form from which hot water resistant products may be obtained.

I claim:

1. The process of producing a moldable precipitate which comprises reacting in molecular ratio of substantially one to two, urea and 40% aqueous formaldehyde by bringing the same to reaction temperatures and by adding the urea in small increments at a time and allowing ebullition to subside after each addition and before the next increment of urea is added, then, after the last addition of urea, continuing said reaction by boiling until the mass is changed in consistency from a thinly fluid condition to a relatvely viscous condition then immediately diluting the same with a relatively large volume of acidulated water having a pH of substantially 1.5 before actual gelation occurs, and thereafter washing and drying the precipitate so produced.

2. A heat and pressure hardened product resistant to boiling water produced by heat hardening the precipitate resulting from the process defined in claim 1.

MELVILLE C. DEARING.